United States Patent Office 3,075,834
Patented Jan. 29, 1963

3,075,834
HERBICIDAL MIXTURES OF POLYCHLOROPHENOLS AND S-TRIAZINES
Jean Lehureau, St. Rambert, Rhone, France, assignor to Progil, S.A., Rhone, France, a corporation of France
No Drawing. Filed Oct. 28, 1959, Ser. No. 849,148
Claims priority, application France Nov. 3, 1958
9 Claims. (Cl. 71—25)

This invention relates to herbicidal compositions.

Chemicals have been used for a long time to kill weeds or for other herbicidal purposes. For a considerable period of time, sodium chlorate was the best known and the most used herbicide. It is cheap but it has serious disadvantages. For instance, when it is mixed with organic matter it is very inflammable and may be explosive. Also, due to its ready solubility in water, the rains wash it away and it is thereby rendered inactive.

Other substances such as sodium sulfamate, sodium trichloroacetate, sodium dichloropropionate, sodium trichloropropionate, sodium pentachlorophenate, mononitrophenate, polynitrophenates, nitrochlorophenates, etc. have been tested as killers of plant life. All these products are more, or less, effective as killers of plant life but their effects are evanescent.

Some substances, more recently used as herbicides, have satisfactory remanent properties but their action is slow and they are very costly. Such substances include substituted ureas and chloroalkylamino-triazines typified by 2-chloro-4,6-bisethylamino-s-triazine and the like.

All herbicides, when small amounts are used, are selective in their effect, i.e. some of them preferentially kill monocotyledons, some of them dicotyledons, etc. By using a particular herbicide in small but carefully regulated amounts, one is able to kill a certain type of plant life but not other types. This selective effect of herbicides is referred to herein as "herbicidal activity spectrum."

Now it has been discovered that a mixture, or blend, of two or more herbicidal substances including chlorophenols, especially pentachlorophenol and its derivatives (salts, esters, etc.) and chloro-alkylaminotriazines, especially 2-chloro-4,6-bisethylamino-s-triazine, possess very prominent herbicidal properties. These types of herbicides, and in particular the two mentioned above, act with different speeds and their herbicidal activity spectra complement one another to a remarkable degree. The mixtures of these herbicides achieve not only a prolonged and more extensive cleaning of fields but also an important increase in their herbicidal power. Putting it another way, an application of a mixture of these herbicides in an effective amount achieves a better kill than an application of an equivalent amount of either alone. For example, a mixture of the two herbicides achieves a better kill than twice the amount of either ingredient of the mixture.

The relative proportions in the blend of chlorophenols, and chloro-alkylaminotriazines is determined by having an amount of each ingredient sufficient to exert a composite synergistic effect. Normally the chlorophenol is used in a predominating amount relative to the amount of the chloro-alkylaminotriazine. Very good synergistic effects have been obtained by using them in a weight ratio of about 10:1 to 4:1.

The blend of the basic herbicide mentioned in the above paragraph can be mixed with other known herbicides to obtain a better or more extensive kill. For example, one could choose complementary herbicidal substances which are especially effective against the prevailing weeds, or other plant life which one wishes to destroy, or one could choose herbicidal substances which broaden the herbicidal spectra of the two basic herbicidal substances.

The blends of the herbidical chemicals of this invention can be formulated with other substances usually used in making herbicidal solutions, powders, emulsions, creams, paste and so forth.

The significance of this invention will be further understood from a consideration of the illustrative embodiments of the invention set out in the examples given below. In all of the examples, the parts are expressed as parts by weight.

*Example 1*

Except as otherwise stated, a test field was selected with many intricate kinds of mono and di-cotyledons for use in all of the examples.

In this example:

(a) A first parcel was sprayed with 80 kg./hectare of sodium pentachlorophenate in an aqueous solution. At the end of the week, 80% of the noxious plant life appeared to be dead but 60% of the plant life which originally seemed dead started to grow again so that at the end of a month only 20% of the noxious plant life was dead.

(b) A second parcel was treated with 8 kg./hectare of 2 - chloro,4,6 - bis - ethylaminotriazine. The percents of the weeds and other noxious growths destroyed is set out below.

| | Percent |
|---|---|
| After one week | 0 |
| After three weeks | 50 |
| After one month | 90 |
| After three months | 90 |

(c) A third comparable parcel was treated with a mixture of 44 kg./hectare composed of 9 parts of sodium pentachlorophenate and 1 part of 2-chloro-4,6-bis-ethylaminotriazine. The destruction of the noxious plant life was 60% after one week and 100% after one month. After four months, 90% of the noxious plant life was still dead but thereafter the regrowth was the same as was the case with (b) above.

*Example 2*

A blend of sodium pentachlorophenate (85 parts) and 2-chloro-4,6-bis-ethylamino-s-triazine (15 parts) was carefully ground and an aqueous dispersion thereof was prepared containing 5% of the herbicidal blend. This dispersion was sprayed on the field being treated in a quantity sufficient to produce a dosage of 20 kg./hectare of active herbicides. The results were the same as in Example 1(c).

*Example 3*

In a colloidal mill, 45 parts of tetrachlorophenol, 5 parts of 2-chloro-4,6-bis-ethylamino-s-triazine, 5 parts of sodium lignosulfate and 45 parts of water were thoroughly mixed to obtain a homogenous easily water dispersible, stable paste having a viscosity of from 5 to 50 poises. This paste forms a stable and finely divided dispersion in water.

When treating fields with dosages equal to those used in Example 1(c), equivalent results were obtained.

Pentachlorophenol may be used in place of the tetrachlorophenol with substantially the same effectiveness.

*Example 4*

A wettable powder was obtained by grinding 45 parts of pentachlorophenol, 5 parts of 2-chloro-4,6-bis-ethylamino-s-triazine, 45 parts of kaolin and five parts of a lignosulfonate in a ball mill.

The application of this composition gave results which are as effective as those used in Example 1(c) but the action was more rapid.

*Example 5*

A warm organic solution containing 20 parts of pentachlorophenol, 2 parts of 2-chloro-4,6-bis-diethylamino s-triazine, 43 parts of creosote and 2 parts of polyethoxylated castor oil was first formed and then emulsified in an aqueous solution containing 12 parts of calcium lignosulfonate and 21 parts of water.

When using equivalent amounts of active chemicals, this blend of herbicides kills the weeds much more rapidly than the mixture used in Example 1(c).

Substantially equivalent results were obtained when replacing the pentachlorophenol with tetrachlorophenol.

*Example 6*

An organic solution was prepared containing 50 parts of pentachlorophenol, 30 parts of methanol, 15 parts of sodium hydroxide (33%) and 5 parts of sulfonated fish-oil. Sufficient 2-chloro - 4,6 - bis-ethylaminotriazine was added to a very fine dispersion of this solution so as to distribute the same amount of active herbicidal substances on the field as in the above examples. The herbicidal results were equal to those mentioned above but the speed of the action was nortably faster.

Substantially equivalent results were obtained when replacing the pentachlorophenol with tetrachlorophenol.

*Example 7*

When the herbicidal mixture was applied to waste fields having growths of resistant Graminaceae, it was found that pentachlorophenol, or sodium pentachlorophenate, could be substituted in part by sodium trichloroacetate or dichloropropionate.

When a blend of 45 parts of sodium pentachlorophenate, 45 parts of sodium trichloroacetate, and 10 parts of 2-chloro-4,6-bis-diethylamino-s-triazine was applied to such a field in an amount of 20–100 kg./hectare, the field was readily cleared of the weeds infesting the field.

*Example 8*

A blend of four herbicides was prepared in which one part of 2-chloro-4,6-bis-diethylamino-s-triazine was replaced by one part of parachlorophenyl-dimethylurea to form a composite mixture containing 45 parts of sodium pentachlorophenate, 45 parts of sodium trichloroacetate, 5 parts of parachlorophenyldimethylurea and 5 parts of 2-chloro-4,6-bis-diethylamino-s-triazine.

A water dispersion of the composite mixture was sprayed on the field in an amount of 20–40 kg./hectare depending upon the density of weed growth. The weeds were killed as in the above example but the treatment was cheaper.

It will be understood that the formulations given above for purely illustrative purposes can be modified both with regard to the herbicides used in the blend and with regard to their proportionate amounts without departing from the spirit or scope of the invention as defined in the appended claims.

What is claimed is:

1. A herbicidal composition comprising by weight a blend of about 10 to 4 parts of a polychlorophenol herbicide containing 4 to 5 chloro substituents in the benzene ring per 1 part of a 2-chloro-4,6-alkylaminotriazine herbicide containing 1–4 carbon atoms in the alkyl radical, said blend being present in a concentration sufficient to exert a herbicidal action.

2. A herbicidal composition comprising by weight a blend of 9 parts of sodium pentachlorophenate and 1 part of 2-chloro-4,6-bis-ethylamino-s-triazine, said blend being present in a concentration sufficient to exert a herbicidal action.

3. A herbicidal composition comprising by weight a blend of 85 parts of sodium pentachlorophenate and 15 parts of 2-chloro-4,6-bis-ethylamino-s-triazine, said blend being present in a concentration sufficient to exert a herbicidal action.

4. A herbicidal composition comprising by weight a blend of 45 parts of tetrachlorophenol and 5 parts of 2-chloro-4,6-bis-ethylamino-s-triazine, said blend being present in a concentration sufficient to exert a herbicidal action.

5. A herbicidal composition comprising by weight a blend of 45 parts of pentachlorophenol and 5 parts of 2-chloro-4,6-bis-ethylamino-s-triazine, said blend being present in a concentration sufficient to exert a herbicidal action.

6. A herbicidal composition comprising by weight a blend of 20 parts of pentachlorophenol and 2 parts of 2-chloro-4,6-bis-diethylamino-s-triazine, said blend being present in a concentration sufficient to exert a herbicidal action.

7. A herbicidal composition comprising by weight a blend of 45 parts of sodium pentachlorophenate, 45 parts of sodium trichloroacetate, and 10 parts of 2-chloro-4,6-bis-diethylamino-s-triazine, said blend being present in a concentration sufficient to exert a herbicidal action.

8. A herbicidal composition comprising by weight a blend of 45 parts of sodium pentachlorophenate, 45 parts of sodium trichloroacetate, 5 parts of parachlorophenyl-dimethylurea and 5 parts of 2-chloro-4,6-bis-diethylamine-s-triazine, said blend being present in a concentration sufficient to exert a herbicidal action.

9. A herbicidal composition comprising a blend of a 2-chloro-4,6-alkylaminotriazine containing 1–4 carbon atoms in the alkyl radical with about 10 times as much of a polychlorophenol containing 4 to 5 chloro substituents in the benzene ring said blend being present in a concentration sufficient to exert a herbicidal action.

References Cited in the file of this patent

UNITED STATES PATENTS

| 2,188,734 | Carswell | Jan. 30, 1940 |
| 2,705,195 | Cupery | Mar. 29, 1955 |
| 2,709,648 | Ryker et al. | May 31, 1955 |
| 2,891,855 | Gysin et al. | June 23, 1959 |

FOREIGN PATENTS

| 156,982 | Australia | June 9, 1954 |

OTHER REFERENCES

Proceedings of 12th Annual Meeting, Northeastern Weed Control Conference, 1958, New York, pages 108 to 111, 225 to 229.